Nov. 24, 1931.  H. C. STELLING  1,833,006
ACETYLENE GENERATOR
Filed Sept. 3, 1927
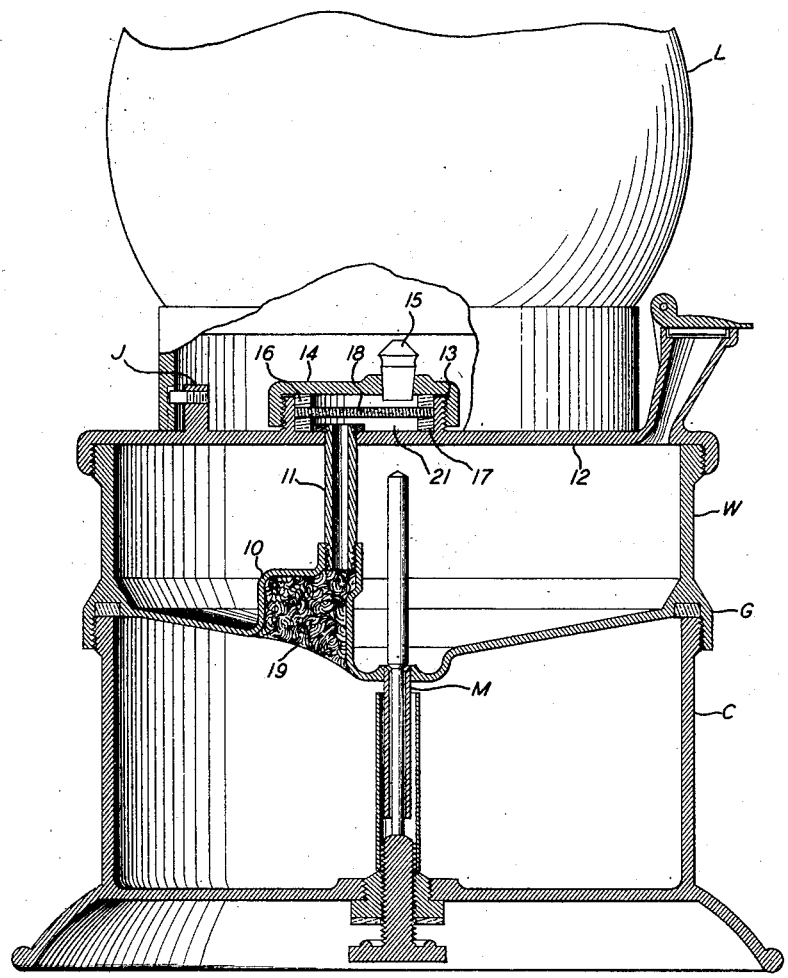
INVENTOR:
Hermann C. Stelling,
BY
Byrne, Townsend & Brickenstein,
ATTORNEYS.

Patented Nov. 24, 1931

1,833,006

UNITED STATES PATENT OFFICE

HERMANN C. STELLING, OF ORANGEBURG, NEW YORK, ASSIGNOR TO UNION CARBIDE SALES COMPANY, A CORPORATION OF WEST VIRGINIA

ACETYLENE GENERATOR

Application filed September 3, 1927. Serial No. 217,393.

My invention relates to acetylene lamps in which the acetylene is generated by the action of water on calcium carbide and especially to means for controlling the gas so that it may be supplied to the burner without excessive fluctuation in pressure.

An object of my invention is to construct such a lamp in which provision is made for minimizing fluctuations in pressure of the gas delivered to the burner. A further object of my invention is to provide a stabilizing means for use in connection with a source of variable pressure. Another object of my invention is to provide means whereby the water reservoir may be utilized as a water seal without permitting the pressure at the burner to reach that required to break the water seal.

These and other objects of my invention will be evident from the following specification having reference to the accompanying drawing in which the single figure is a cross section of a generator for an acetylene lamp constructed in accordance with my invention.

In this figure I show a generator G comprising a water chamber W and a carbide chamber C. The carbide chamber C is in the form of a cup, the water chamber W being secured to the top thereof. A lamp housing L which may be of any desired construction is secured to the top of the water chamber by any suitable means as by bayonet joints J. While I may use any type of mechanism for controlling the flow of water from the water chamber W to the carbide chamber C, I have found the type illustrated at M in the present drawing and more fully described and claimed in the copending application of Wm F. Hunt and Hermann C. Stelling, Serial No. 219,533 filed Sept. 14, 1927 which matured into Patent No. 1,791,595, well adapted for this purpose.

The bottom of the water chamber W is formed with a hollow boss 10, forming a chamber, and a conduit 11 extending from this chamber through the removable cover 12 of the water chamber. Surrounding the outlet of the conduit 11 is an annulus 13 which is preferably integral with the cover 12 and is screw threaded or otherwise constructed to receive a removable cap 14. A burner 15 extends through the cap 14 and is desirably disposed substantially coaxial with the generator and centrally of the housing L. Within the annulus 13 I provide annular washers 16 and 17 of rubber or other resilient impervious material. Between these washers is clamped a plate 18 of filter stone or other suitable pervious material, preferably of a ceramic nature. In the interior of the chamber 10, I provide a filter or scrubber of felt, mineral wool or other suitable material for removing water, particles of lime or carbide and the like from the gas generated in the carbide chamber C.

The operation of my device is as follows: The water chamber W is filled with water, and carbide is placed in the chamber C. The water flows downward from the chamber W through the water feed valve and regulating mechanism M to the chamber C and reacts with the calcium carbide therein to form acetylene gas. This gas passes upward through the scrubber 19 and the conduit 11 to an expansion chamber 21 formed by a portion of the cover 12, the plate 18 and the washer 17. The plate 18 is made of such a porosity that the gas diffuses slowly therethrough. After passing through the plate 18 the gas passes to the burner 15.

The plate 18 has an entirely different function from the scrubber 19. The purpose of the scrubber is to first remove water, particles of lime and other substances from the gas, whereas the stabilizer 18 serves primarily to retard the flow and control the fluctuation of gas pressure between the place of generation and point of use. As the gas is generated in small quantities, a little irregularity in the water feed will cause fluctuation in rapidity of generation and consequent variation in pressure of the gas, which is rendered uniform by the stabilizer and kept under the maximum limit, thereby delaying the passage of the gas to such an extent as to prevent it flowing through rapidly enough to cause a flare. This is especially important at the time water is first added to the carbide in starting to use the lamp, as at this time there is a possibility of irregularity in the generation of the gas. Similarly, when the lamp is moved violently, as in signalling, the water may be caused to wet a greater mass of carbide, in which case a similar irregularity in gas pressure ordinarily occurs.

Acetylene generators are generally provided with some type of excess pressure relief means in order to relieve excessive gas pressures therein. In generators of the type herein disclosed, any excessive pressure is relieved by breaking through the seal formed by the body of water in reservoir. However, in a generator where a water reservoir of large capacity is provided so that a lamp may burn continuously for an entire night, the height of the reservoir is often so great that the hydrostatic head produces a pressure at the burner great enough to cause considerable flaring before the water seal breaks. The use of my improved stabilizer with such generators is particularly advantageous because it serves to reduce the gas pressure at the burner to such an extent that the water seal breaks before the flaring occurs. By the use of a plate of ceramic filtering material in the herein disclosed stabilizer I am enabled to use a reservoir having a hydrostatic head of 6 inches of water without producing pressure at the burner greater than that corresponding to 3 inches of water, thus providing a portable generator and lamp which will operate safely, uniformly and without attention for a much longer period than those heretofore known.

The ceramic filtering material mentioned above has the same general character as the filtering material disclosed in Patents No. 1,117,601 and No. 1,118,441 to Porter and is known commercially as "Filtros #3". Such filtering material is prepared, for instance, by fusing together particles of a silica containing material such as quartz, sand, or the like to provide a plate having a large number of capillary passages of such size that the plate is gas permeable.

While I have shown the pervious element of the stabilizer as a plate, it will be evident to those skilled in the art that it may take other forms, and while I prefer to use a solid plate I do not wish to limit myself to such a plate as I may instead employ a mass of loose material such as sand.

I am aware that it is common in acetylene generators to provide scrubbers or filters of felt, mineral wool or the like for removing water or dust from the gas. These do not serve as pressure stabilizers because they are not dense enough to perform this function. Moreover, a filtering means having apertures therethrough small enough to equalize gas pressure if so employed alone, very quickly becomes clogged by the water and dust entrained by the generated gas and ceases to function for either purpose. I am also aware that it has been proposed to use porous material in the conduits between compressed acetylene tanks and burners for the purpose of preventing flashbacks from the burner to the tank. These have been used only with a source of constant pressure and as a safety anti-flash back protection and have not heretofore been employed in stabilizing the pressure of filtered gas delivered to a burner from a source of variable pressure.

I claim:

1. The combination with an acetylene generator, of a gas conduit communicating with the generating chamber thereof, said gas conduit comprising a gas expansion chamber, porous means in said gas expansion chamber, to minimize fluctuations in the pressure of the gas delivered from said conduit, and gas scrubbing means between said generating chamber and said porous means.

2. An acetylene lamp comprising the combination of an acetylene generator, a stabilizing chamber, a burner, a gas conduit from said generator to said stabilizing chamber and a porous ceramic substance in said stabilizing chamber through which said gas passes whereby variations in the pressure of the gas delivered to said burner are minimized.

3. An acetylene lamp comprising the combination of an acetylene generator, a stabilizing chamber, a burner, a gas conduit from said generator to said stabilizing chamber, a scrubber in said conduit, a porous substance in said stabilizing chamber through which said gas passes whereby variations in the pressure of the gas delivered to said burner are minimized, said burner being mounted on and in communication with said chamber.

4. A pressure stabilizing device for an acetylene lamp comprising the combination of a stabilizing chamber, a cover therefor, a washer resting on the bottom of said chamber, a plate of porous material resting on said washer and a second washer resting on said plate and engaging the cover of said chamber whereby said cover compresses said washers against said plate, said chamber and said cover each being provided with an aperture for the passage of gas therethrough.

5. An acetylene generator comprising the combination of a water chamber, a cup-shaped carbide chamber secured to the bottom thereof, means for feeding water from said water chamber to said carbide chamber, a gas conduit extending from said carbide chamber through said water chamber, an annulus on the top of said water chamber surrounding the outlet opening of said conduit, a pair of resilient impervious washers within said annulus, a plate of porous material between said washers and an apertured cap engaging said annulus and compressing said washers against said plate.

6. An acetylene lamp comprising the combination of a water chamber, a cup-shaped carbide chamber secured to the bottom of said water chamber, means for supplying water to said carbide chamber from said water chamber, the bottom of said water chamber being provided with a hollow boss forming a chamber, a filtering material within the chamber, a gas conduit extending from said chamber through the top of the water chamber, an annulus integral with said water chamber surrounding the outlet opening of said conduit, a pair of resilient impervious washers within said annulus, a plate of porous material between said washers, a cap engaging said annulus and compressing said washers against said plate, and a burner secured to said cap.

7. An acetylene lamp comprising the combination of an acetylene generator, a stabilizing chamber, a burner in communication with said chamber, a gas conduit from the said generator to said stabilizing chamber and a porous ceramic plate forming a partition in said stabilizing chamber through which said gas passes, whereby variations in the pressure of the gas delivered to said burner are minimized, said plate having such a porosity as to reduce a pressure equal to six inches of water to a pressure equal to 3 inches of water during passage therethrough.

In testimony whereof, I affix my signature.

HERMANN C. STELLING.